though the U-

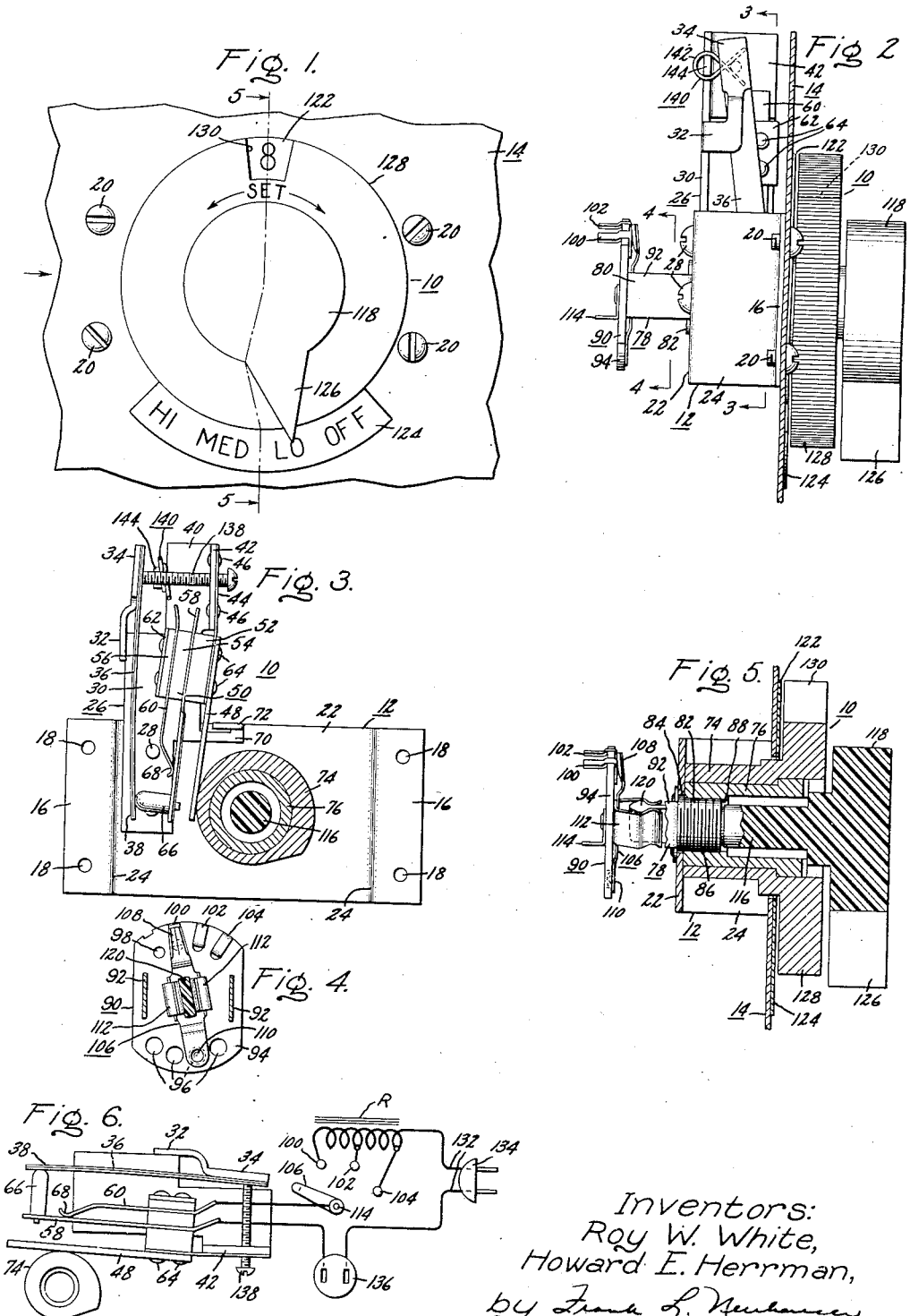

United States Patent Office 2,769,061
Patented Oct. 30, 1956

2,769,061

CONCENTRIC SWITCH AND THERMOSTAT CONTROL

Roy W. White, Norwalk, Conn., and Howard E. Herrman, Clinton, Iowa, assignors to General Electric Company, a corporation of New York Application September 27, 1954, Serial No. 458,344

11 Claims. (Cl. 200—139)

This invention relates to a manual control, and particularly to a combined speed and thermostat control for an electric fan.

With the tendency toward automatism in all fields of endeavor, the ventilating and cooling art has quite actively striven to provide automatic ventilating and cooling apparatus. This is quite common in the more expensive types of ventilating and cooling apparatus, such as air conditioners. However, recently the less expensive cooling appliances, such as fans, have begun to be provided with some degree of automatism by incorporating a thermostat in the circuit, which automatically opens the circuit when the temperature goes below the desired point and automatically closes the circuit when the temperature goes above this point. Fans which incorporate a thermostatic control of this type will cycle around the desired temperature in the same manner as heating or cooling devices which include a thermostatic control. In fans of this type, it is desirable to provide several fan blade speeds, and for this purpose a switch is normally provided which incorporates an "off" position and several "on" speed positions. It will be appreciated that the rate at which ventilation takes place is dependent upon the speed of the fan blade to a large extent. In fans heretofore provided with both thermostatic controls and speed controls, it has been the practice to incorporate them in separate units which are attached to the fan casing in some manner. For the purpose of providing a simple, pleasing, ornamental appearance, by avoiding the cluttered effect which is produced by attaching a large number of mechanisms to a fan casing, and to minimize the cost of production and assembly of such fans, it is highly desirable that a unitary arrangement be provided which may be attached to the fan casing, and which will include both the speed control and the thermostat control.

It is an object of our invention to provide a unitary combined speed control and thermostat control for an electric fan, which is simple in construction, low in cost and facile in production and assembly.

The object of our invention is accomplished in one form by mounting a speed control switch and a thermostat on a mounting bracket, and providing control shafts for them, one mounted concentrically about the other, to thereby provide a compact unitary construction which may be mounted as a single unit on a fan casing.

The above and other objects of our invention and further details of that which we believe to be novel will be clear from the following description and claims taken with the accompanying drawings, wherein:

Fig. 1 is a front elevation view of our unitary control mounted on a fan casing, only a portion of the casing being shown.

Fig. 2 is a side elevation view of the structure illustrated in Fig. 1 looking in the direction of the arrow in Fig. 1.

Fig. 3 is a sectional view taken on line 3—3 of Fig. 2.

Fig. 4 is a sectional view taken on line 4—4 of Fig. 2.

Fig. 5 is a sectional view taken on line 5—5 of Fig. 1.

Fig. 6 is a diagrammatic view showing the control and the electrical circuit in which it is disposed.

Referring to the drawings, reference numeral 10 designates the unitary speed and thermostat control, all of the parts of which are secured to a mounting bracket 12, which is in turn mounted on wall 14, which is part of a conventional fan casing. Bracket 12 is channel-shaped and has two spaced mounting flanges 16 having openings 18 therein which are threaded and adapted to receive threaded bolts 20, which pass through appropriate openings in the wall 14 and are threaded into openings 18. Bracket 12 also comprises central wall 22 having connecting legs 24 extending at right angles thereto, which connect the central wall 22 to the mounting flanges 16.

All of the operative parts of the control are mounted on the central wall 22. Referring to Fig. 3, it will be seen that the thermostat is mounted on thermostat mounting frame 26, which is secured to the central wall 22 near one of its corners by bolts 28 or the equivalent. Frame 26 comprises a flat wall portion 30, having an L-shaped leg 32 bent normal to the plane of wall portion 30 at one of its corners. The free end 34 of leg 32 is offset and supports one end of bimetallic strip 36. When mounted in assembled position, strip 36 extends at a slight angle to the wall 30 in one plane (see Fig. 2), and generally parallel to the connecting legs 24 in another plane (see Fig. 3).

Frame 26 also includes an extension 40 which is a partial continuation of the flat wall 39 and has a side portion 42 which is bent normal to extension 40 and is generally parallel to the L-shaped leg 32. Portion 42 supports a mounting strip 44, by rivets 46 or the like, which extends away from the portion and supports a lever 48 and a carrier 50 at its free end. Carrier 50 comprises three layers, 52, 54 and 56, of insulating material which support two contact strips 58 and 60 in spaced, parallel relation. In Fig. 3 it will be observed that the lever 48, the free end of mounting strip 44, the carrier layer 52, the contact strip 58, the carrier layer 54, the contact strip 60, the carrier layer 56 and the wear plate 62 are all maintained in assembled position by rivets 64.

Contact strip 58 is substantially a flat strip of an electrical conducting material having a pressure plug 66 formed of an insulating material secured at its free end. The pressure plug 66 contacts the free end 38 of bimetallic strip 36; these parts are in contact and the contact strip 58 and bimetallic strip 36 are under tension at all times. The free end of contact strip 60 is bent into a curved hook 68, which is adapted to make and break contact with contact strip 58 as will become apparent when the operation of the device is explained. The thermostat frame 26 includes a laterally extending portion 70 having an L-shaped leg 72 disposed at a right angle thereto. The free end of leg 72 constitutes a stop for lever 48. The free end of lever 48 is operatively associated with the cam surface of thermostat cam sleeve 74, which is mounted for rotation on bushing 76 that is rigidly secured to one side of the central wall 22 of the mounting bracket 12.

The connection between bushing 76 and the wall 22 is made by switch plate mounting member 78. Member 78 comprises a U-shaped portion 80 and a cylindrical portion 82 that is adapted to pass through opening 84 in the central wall 22 and have its threaded outer surface 86 secured in the internally threaded portion 88 of the bushing 76. As viewed in Fig. 5 it will be observed that the switch plate mounting member 78, in addition to being a means for securing the bushing 76 rigidly to one side of central wall 22, constitutes a means for mounting the switch plate 90 on the other side. Though the U- shaped portion 80 of the member 78 is not shown completely in either Figs. 2 or 5, in Fig. 4, where the switch plate 90 is shown in detail, it will be observed that the two legs 92 of the U-shaped portion are shown.

Switch plate 90 comprises a flat insulating member 94 to which the ends of legs 92 are connected in an appropriate manner, which has four openings 96 punched near one edge, and an opening 98 punched and three contacts 100, 102, and 104 placed on an opposite edge. Portions of the contacts extend over the adjacent edge of member 94 and constitute terminals for wires which are connected either to a reactance or to the field coils of a motor or to some other means of reducing the speed of rotation of the fan. Secured centrally and pivotally with relation to the plate 94 is a switch blade 106. Switch blade 106 has a contact 108 formed at one end and a positioning bulge 110 at the opposite end. The switch blade has a spring clamp 112 secured to it on one side which constitutes a female coupling portion as will become apparent. Clamp 112 is rotatably mounted on a stub shaft which extends through the plate 94 and has an angle-shaped contact 114 on the other side of the plate. The contact 114 constitutes a terminal and is adapted to have an electrical wire connected to it which also is connected to the contact strip 60.

Rotatably received within the bushing 76 is switch shaft 116 having a knob 118 formed at one end and a male coupling portion 120 at its other end. Coupling portion 120 is adapted to be received within the clamp 112, and when so mounted, the shaft 116 constitutes a means for manually adjusting the switch blade 106 to any one of its four positions. By reference to Fig. 4 it will be seen that the switch blade may be rotated so that its contact 108 makes contact with any one of contacts 100, 102 or 104, to thereby alter the speed of the motor, or it may be received in the opening 98 which is the "off" position. It should be apparent that in switching the switch blade, the bulge 110 seats in one of the openings 96, and thereby constitutes a positioning means.

By reference to Fig. 1 it will be observed that the wall 14 has a generally circular indicia plate 122 mounted thereon having a series of numbers which are calibrated with relation to the thermostat, and correspond to different settings of the thermostat. Thermostat dial 128 is formed on the outer end of the thermostat cam sleeve 74 and has a notch 130 formed therein. By rotating the dial 128 the notch 130 uncovers one of the numbers on the indicia plate 122. It will also be observed in Fig. 3 that rotation of the cam sleeve 74 has an effect on the end of lever 48 of the thermostat. When the operation of the thermostat is explained it will become apparent that rotation of the dial 128 causes rotation of the cam sleeve 74 which in turn has the effect of altering the setting of the thermostat.

The lower portion of the indicia plate 122 has an arcuate extension 124 having several letter markings which refer to the switch setting. It will be observed that there are four possible positions: off, low, medium and high. These positions are indicated by the pointer 126 formed on the switch knob 118, and are correlated to the positions of the switch blade 106 relative to the switch plate 90.

Referring to Fig. 6 the remainder of the circuit will be explained. As was previously mentioned, the switch contacts 100, 102 and 104 are connected to either a reactance or the field coils of a motor, or to some other means of reducing the speed of rotation of the fan, as is well known. In Fig. 6 a reactance R is shown. The reactance is connected to one of the lead wires of a conventional electrical cord 132 having an electrical plug 134 at its free end. The other lead wire is illustrated as being connected to an electrical plug receptacle 136 which is adapted to have the electrical plug from the cord of a fan coupled thereto. It will be understood that receptacle 136 may be eliminated and the field coils of a motor wired directly in the circuit. One of the lead wires from the receptacle 136 is connected to the contact strip 58. As was previously mentioned a lead wire connects the terminal 114 of the switch blade to the contact strip 60.

The specific thermostat construction does not form any specific part of our invention, however, an understanding of it will aid in understanding our invention. Assuming the temperature is above that set by dial 128 and the switch is in one of the "on" positions, the thermostat parts will assume the positions shown in Fig. 3; the contact strips 58 and 60 are engaged and the circuit is closed. The motor and fan will operate and ventilate the area; upon cooling to a predetermined temperature (that set by dial 128), the bimetal strip 36 will react in response to the temperature drop and its end 38 will deflect to the right. Strip 58 will be forced away from the strip 60, breaking contact therewith, breaking the circuit and stopping the motor and fan. The area will then warm up, and if the temperature goes above the predetermined temperature, the free end 38 of the bimetallic strip 36 will deflect to the left and the strip 58 will contact strip 60 and thereby close the circuit and start the motor and fan again. This cycling effect around a predetermined temperature causes the motor to operate periodically and thereby drive the fan blade only when the contact strips are in contact. Therefore, the fan operates when the temperature goes above a predetermined point and it automatically ceases to operate when it goes below this point.

To vary the temperature at which the contact strips will make and break contact, the cam sleeve 74 is rotated by the cam dial 128. If the dial 128 as shown in Fig. 1 is rotated counterclockwise, the cam sleeve as shown in Fig. 3 is rotated counterclockwise and a wider portion of the cam sleeve will come in contact with the lever 48 than that which is shown as being in contact therewith in Fig. 3. The lever will be urged to the left, causing the carriage 50 to move to the left. The carriage 50 moves strips 58 and 60 to the left and causes the plug 66 to press harder against the free end 38 of bimetallic strip 36; since bimetallic strip 36 is more rigid than strip 58, movement of strip 58 is substantially restrained, whereas movement of strip 60 is unrestrained. This causes the hook 68 to move to the left. Therefore, the free end 38 of bimetallic strip 36 must deflect less from left to right before it moves strip 58 away from hook 68 to break the circuit than under the prior setting. Therefore, the temperature at which the cycling will take place is higher than that for the prior setting. By selecting any reasonable number of positions on the cam surface, and calibrating the thermostat portion of the indicia plate 122 appropriately, a reasonable amount of selectivity is afforded the user. It should be apparent that the dimensions of the parts and the thermal characteristics of the bimetallic strip 36 employed will determine the temperature at which the circuit is opened and closed. These aspects may be determined in a known manner to provide control over the desired temperature range.

A major thermostat adjustment is provided which normally will not be utilized except when it is desired to alter the operation of the thermostat materially. This adjustment is most clearly shown in Fig. 3 and is in the form of a threaded bolt 138 which is threadedly adjustable in the leg 42 and which has its end abutting against the end of bimetallic strip 36 which is opposite to the free end 38. The adjusting screw 138 is maintained in proper alignment and locked in adjusted position by the torsion spring 140, which has a loop 142 positioned on the laterally extending tab 144 formed on the extension 40. By adjusting the screw 138, the position of bimetallic strip 36 is altered; this affords a major adjustment for its ultimate effect is that it varies the positions of some of the other parts of the thermostat, and hence the temperature at which the contact strips make or break contact. It will be appreciated that this adjustment is normally not employed by the user, it being primarily a factory adjustment, and that it is only made at infrequent intervals to calibrate the thermostat control.

As was previously mentioned, the position of switch blade 106 determines whether the fan is "on" or "off," and if "on" the speed at which the fan rotates, and that the switch blade position is controlled by the switch knob 118. The switch blade position determines the amount of reactance, field coils or other means for reducing the fan speed of rotation that is in the circuit, and this determines the speed of the motor, as is well known. From the foregoing, it will be apparent that a three-speed fan control and a multiposition thermostat control has been provided. Both of these are incorporated in a unitary assembly which is mounted on a single mounting bracket which may be secured directly in a convenient position on a fan casing, simply and economically.

As will be evident from the foregoing description, certain aspects of our invention are not limited to the particular details of construction of the example illustrated, and we contemplate that various and other modifications and applications will occur to those skilled in the art. It is, therefore, our intention that the appended claims shall cover such modifications and applications as do not depart from the true spirit and scope of our invention.

What we claim as new and desire to secure by Letters Patent of the United States is:

1. A control device comprising a rotatable switch shaft, a thermostat, a rotatable thermostat control shaft concentric with said switch shaft and disposed radially outwardly therefrom, said thermostat control shaft having a generally cylindrical axial innerbore to receive said switch shaft, and a cam surface formed on the outer periphery of said thermostat control shaft for setting said thermostat.

2. A control device comprising a rotatable switch shaft having two ends, a dial formed on one end of said switch shaft, means formed on the other end of said switch shaft for connecting said shaft to said switch, a rotatable thermostat control shaft having two ends, said thermostat control shaft being disposed between the two ends of said switch shaft concentric with said switch shaft and disposed radially outwardly therefrom, said thermostat control shaft having a generally cylindrical innerbore to receive said switch shaft and having a cam surface formed on the outer periphery thereof for controlling said thermostat, said thermostat control shaft having a dial formed on one end thereof adjacent to the dial formed on said switch shaft.

3. A control device comprising a switch shaft having two ends, a thermostat, a rotatable thermostat control shaft concentric with said switch shaft and disposed radially outwardly therefrom, said thermostat control shaft having a generally cylindrical innerbore to receive said switch shaft, and having a cam surface formed on the outer periphery thereof for controlling said thermostat, one end of said switch shaft extending beyond said thermostat shaft for controlling said switch.

4. A unitary control comprising a mounting bracket, a multiposition switch element, a variable thermostat element, a bushing secured to said bracket, a pair of concentric shafts, one of said shafts being operatively associated with one of said elements, the other shaft operatively associated with the other of said elements, one of said shafts being rotatably supported within said bushing, and the other shaft being rotatably supported about said bushing.

5. A device as defined in claim 4 wherein the shaft supported about said bushing has a cam surface positioned adjacent to said thermostat element and operatively associated therewith.

6. A device as defined in claim 5 wherein said thermostat element includes a lever for adjusting the thermostat element to thereby alter the thermostat setting, and said cam surface contacts said lever and acts upon it.

7. A device as defined in claim 4 wherein the elements are each responsive to rotation of their associated shaft, each of said shafts has a knob formed on an end which is accessible from without the control, and said control includes an indicia plate which is juxtaposed to said knobs and has markings that correspond to settings of the elements.

8. A device as defined in claim 7 wherein said knobs are coaxial, one being a notched dial and the other including a pointer.

9. A device as defined in claim 8 wherein said thermostat comprises a pair of contacts, and means including a lever that engages said cam surface for positioning said contacts, the position of the contacts being dependent upon the portion of the cam surface which engages said lever.

10. A device as defined in claim 8 wherein an indicia plate is mounted adjacent to said knobs, said plate having markings corresponding to switch and thermostat settings, said knobs being coaxial, said shaft knob having an indicating portion disposed adjacent to the switch setting markings, and said sleeve knob having an indicating portion adjacent to the thermostat setting markings.

11. A unitary control comprising a mounting bracket, a bushing rigidly secured to said bracket and extending on one side thereof, a switch plate mounted on the other side of said bracket, said switch plate comprising a plurality of contacts each having a terminal adapted to have an electrical wire connected thereto, a shaft rotatably mounted within said bushing and extending on both sides of said bracket, a switch blade connected to one end of said shaft and having a contact mounted adjacent to said switch plate that is adapted to engage one of the switch plate contacts, a knob formed on the other end of said shaft, a thermostat mounted on said bracket on the side opposite to the side on which said switch plate is mounted, a sleeve rotatably mounted about said bushing, a cam surface formed on one end of said sleeve adjacent to said thermostat and operatively associated therewith, and a knob formed on the other end of said sleeve, adjacent to said first mentioned knob.

References Cited in the file of this patent
UNITED STATES PATENTS

| | | |
|---|---|---|
| 2,222,800 | Kriechbaum | Nov. 26, 1940 |
| 2,237,720 | Waddell | Apr. 8, 1941 |
| 2,245,060 | Waddell | June 10, 1941 |